US005852862A

United States Patent [19]

Clayton

[11] Patent Number: 5,852,862

[45] Date of Patent: Dec. 29, 1998

[54] HINGE AND WINDOW TOOL SYSTEM

[76] Inventor: Larry S. Clayton, 1993 Poplar Ridge, Lawrenceville, Ga. 30244

[21] Appl. No.: 803,074

[22] Filed: Feb. 20, 1997

[51] Int. Cl.[6] .......... B23P 19/04

[52] U.S. Cl. .......... 29/239; 7/166; 29/242; 29/253; 29/275

[58] Field of Search .......... 29/239, 242, 243, 29/58, 253, 256, 264, 265, 275, 278, 281.1; 7/165, 166

[56] References Cited

U.S. PATENT DOCUMENTS

| | | | |
|---|---|---|---|
| 686,424 | 11/1901 | Smith | 7/165 |
| 1,323,056 | 11/1919 | Hofmann | 7/165 |
| 3,210,832 | 10/1965 | Kalen | 29/278 |
| 3,602,969 | 9/1971 | Provost | 29/275 |
| 4,183,133 | 1/1980 | Abbott | 29/275 |
| 4,188,701 | 2/1980 | Ludwig | 29/275 |
| 5,054,180 | 10/1991 | Combs | 29/275 |
| 5,099,562 | 3/1992 | Loughran | 29/275 |

*Primary Examiner*—James G. Smith
*Assistant Examiner*—Lee Wilson

[57] ABSTRACT

A hinge and window tool system including a handle, a first combined hinge pin removal and window break head detachably attachable to the handle, a second combined hinge pin removal and window break head detachably attachable to the handle, and a two ended screw driver member detachably attachable to the handle.

18 Claims, 3 Drawing Sheets

HINGE AND WINDOW TOOL SYSTEM

TECHNICAL FIELD

The present invention relates to tools and more particularly to a tool system for loosening hinge pins and windows that includes a handle, a first combined hinge pin removal and window break head detachably attachable to the handle, a second combined hinge pin removal and window break head detachably attachable to the handle, and a two ended screw driver member detachably attachable to the handle.

BACKGROUND OF THE INVENTION

When doing renovation work and the like it is often necessary to remove doors with frozen hinge pins and open windows that have been painted shut. It would be benefit in these situations to have a combined hinge and window tool system that could be used to remove the frozen hinge pins and to pry open the painted shut windows. Because door hinges can have various sized hinge pins it would also be a benefit to have such a system that included multiple combined hinge pin removal and window break heads that could be attached to a handle and used as required. Also, because it is often necessary to unscrew a hinge plate or otherwise remove or loosen a screw it would be a further benefit if the combined hinge and window tool system included a screwdriver shaft that was attachable to the handle to allow the user to remove or loosen screws as necessary without retrieving a separate tool.

SUMMARY OF THE INVENTION

It is thus an object of the invention to provide a hinge and window tool system.

It is a further object of the invention to provide a hinge and window tool system that includes a combined hinge pin removal and window break head having a claw side for freeing frozen hinge pins, a claw anvil side, a window break side for freeing painted shut windows, and a window break anvil side.

It is a still further object of the invention to provide a hinge and window tool system that includes multiple, graduated sized, detachable combined hinge pin removal and window break heads each having a claw side for freeing frozen hinge pins, a claw anvil side, a window break side for freeing painted shut windows, and a window break anvil side.

It is a still further object of the invention to provide a hinge and window tool system that includes a detachable screwdriver shaft that is attachable to the handle to allow the user to remove or loosen screws as necessary without retrieving a separate tool.

It is a still further object of the invention to provide a hinge and window tool system that accomplishes some or all of the above objects In combination.

Accordingly, a hinge and window tool system is provided. The hinge and window tool system includes a handle, a first combined hinge pin removal and window break head detachably attachable to the handle, a second combined hinge pin removal and window break head detachably attachable to the handle, and a two-ended screw driver member detachably attachable to the handle.

The handle includes handle shaft having a threaded outer end, a faceted socket cavity formed into the handle shaft, and a spring loaded screw driver shaft retaining mechanism positioned within the handle shaft. The screw driver shaft retaining mechanism includes a spring loaded retaining bearing mounted on a user depressible release button member. The depressible button member includes a release button extending out through the side of the handle shaft.

The first combined hinge pin removal and window break head is of cast steel construction and includes a first attachment aperture companionately threaded to screw onto the threaded outer end of the handle. The first combined hinge pin removal and window break head includes a first claw side, a first claw anvil side, a first window break side, and a first window break anvil side. The first claw side includes two first claw members spaced a first distance apart. Each first claw member has a first beveled outwardly facing edge of a first edge length. The first claw anvil side is positioned opposite the first claw side and includes a planar hammer strike surface. The first window break side has a first beveled outwardly facing break edge of a first break edge length formed along the entire length thereof. The first window break anvil side is positioned opposite the first window break side and includes a planar hammer strike surface.

The second combined hinge pin removal and window break head has a second attachment aperture companionately threaded to screw onto the threaded outer end of the handle. The second combined hinge pin removal and window break head includes a second claw side, a second claw anvil side, a second window break side, and a second window break anvil side. The second claw side includes two second claw members spaced a second distance apart. Each second claw member has a second beveled outwardly facing edge of a second edge length. The second claw anvil side is positioned opposite the second claw side and includes a planar hammer strike surface. The second window break side has a second beveled outwardly facing break edge of a second break edge length along the entire length thereof. The second window break anvil side is positioned opposite the second window break side and includes a planar hammer strike surface.

The two ended screw driver member has a first screw driver end and a second screw driver end formed at either end of a faceted screw driver shaft. The faceted screw driver shaft has a first circumferential locking bearing groove adjacent to the first screw driver end and a second circumferential locking bearing groove adjacent to the second screw driver end. The first and second circumferential locking bearing grooves are sized and positioned along the faceted screw driver shaft in a manner such that when the first screw driver end is positioned within the faceted socket cavity the spring loaded retaining bearing is urged into and held within the first circumferential locking bearing groove and when the second screw driver end is positioned within the faceted socket cavity the spring loaded retaining bearing is urged into and held within the second circumferential locking bearing groove. The spring loaded retaining bearing maintaining the screwdriver shaft in connection with the handle when held within the first and second circumferential locking bearing grooves until the release button of the depressible release button member is depressed by the user.

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers and wherein.

DESCRIPTION OF THE EXEMPLARY EMBODIMENT

Figure 1:
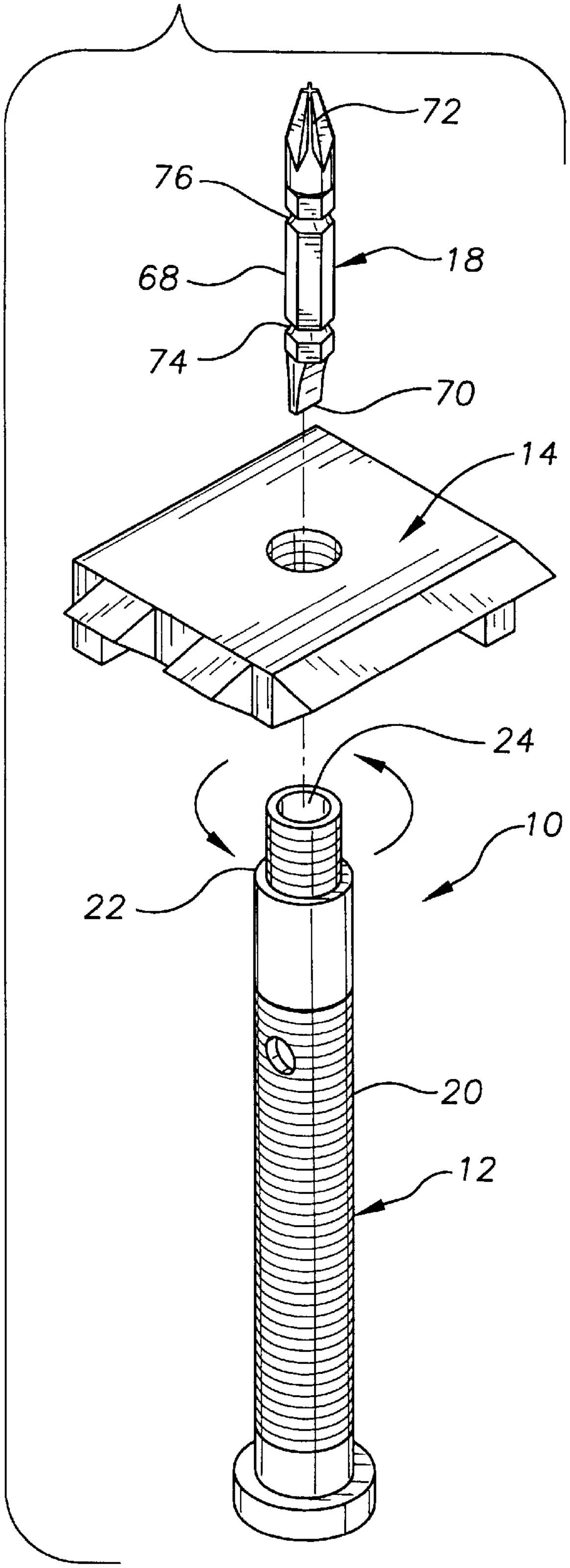
FIG. 1 is an exploded perspective view of an exemplary embodiment of the hinge and window tool system showing the handle, the first combined hinge pin removal and window break heads, and the two ended screw driver member.

FIG. 1 shows an exemplary embodiment of the hinge and window tool system of the present invention generally designated by the numeral 10. Tool system 10 includes a handle, generally designated by the numeral 12; a first combined hinge pin removal and window break head, generally designated by the numeral 14; a second combined hinge pin removal and window break head, generally designated by numeral 16 (FIG. 5); and a two-ended screw driver member, generally designated by the numeral 18.

Figure 2:
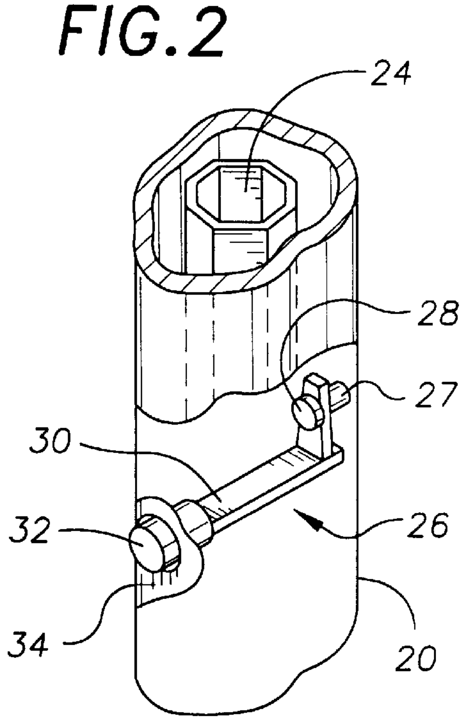
FIG. 2 is a partial detail cutaway view of showing the faceted socket cavity formed into the handle shaft, and the spring loaded screw driver shaft retaining mechanism positioned within the handle shaft including the spring loaded retaining bearing, the user depressible release button member, and the release button.

Handle 12 includes steel handle shaft 20 having a threaded outer end 22, a faceted socket cavity 24 formed into the same end of handle shaft 20 as threaded outer end 22, and, with reference now to FIG. 2, a spring loaded screw driver shaft retaining mechanism, generally designated by the numeral 26. Screw driver shaft retaining mechanism 26 includes a spring 27 and a spring loaded retaining bearing 28 mounted on a user depressible release button member 30. Depressible button member 30 includes a release button 32 that extending out through the side 34 of handle shaft 20.

Figure 3:
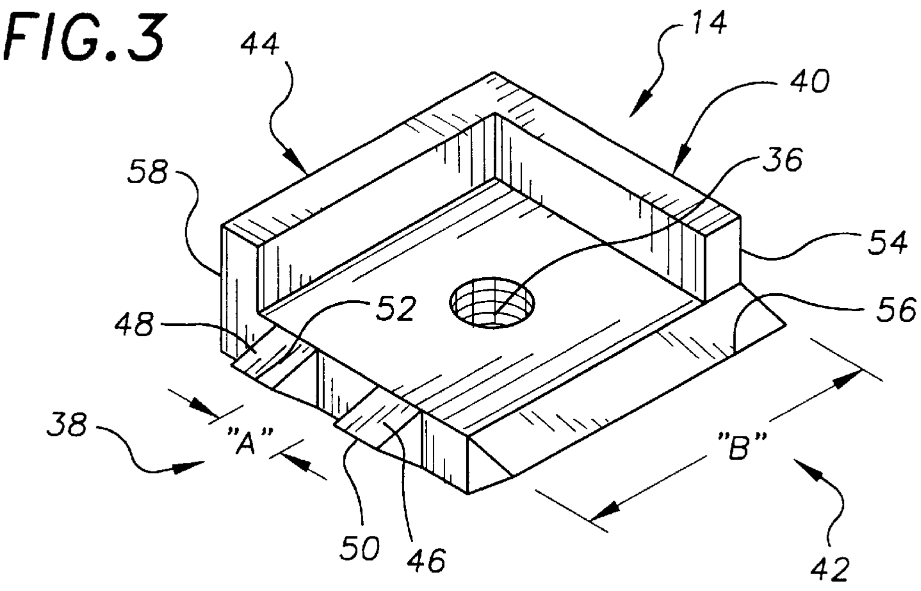
FIG. 3 is a perspective view of the first combined hinge pin removal and window break head of FIG. 1 showing the first attachment aperture, the first claw side, the first claw anvil side, the first window break side, and the first window break anvil side.

Referring now to FIG. 3, first combined hinge pin removal and window break head 14 is of cast steel construction and includes a first attachment aperture 36 companionately threaded to screw onto threaded outer end 22 of handle 12. First combined hinge pin removal and window break head 14 includes a first claw side, generally designated by the numeral 38; a first claw anvil side, generally designated by the numeral 40; a first window break side, generally designated by the numeral 42; and a first window break anvil side, generally designated by the numeral 44. First claw side 38 includes two triangular shaped first claw members 46,48 spaced apart a first distance "A" of one-quarter inch. Each first claw member 46,48 has a first beveled outwardly facing edge 50,52, respectively, of a first edge length. First claw anvil side 40 is positioned opposite first claw side 38 and includes a planar hammer strike surface 54.

Figure 4:
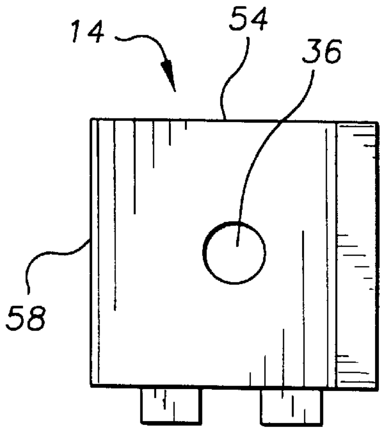
FIG. 4 is a top plan view of the first combined hinge pin removal and window break head of FIG. 4 showing the two first claw members spaced a first distance apart.

First window break side 42 has a first beveled outwardly facing break edge 56 of a first break edge length "B" of two inches that is formed along the entire length thereof. First window break anvil side 44 is positioned opposite first window break side 42 and includes a planar hammer strike surface 58. FIG. 4 is an underside view of first combined hinge pin removal and window break head 14 showing planar hammer strike surfaces 54 and 58.

Figure 5:
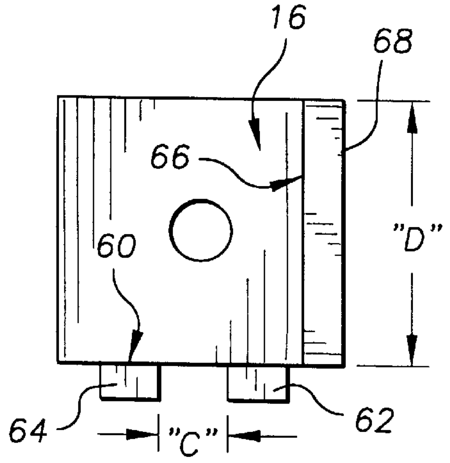
FIG. 5 is a top plan view of the second combined hinge pin removal and window break head of the hinge and window tool system of the present invention showing the two second claw members spaced a second distance apart.

With reference to FIG. 5, second combined hinge pin removal and window break head 16 is identical in construction to first combined hinge pin removal and window break head 14 except that a second claw side 60 includes two second claw members 62,64 that are spaced apart a distance "C" of three-eighths inch and a second window break side 66 has a second beveled outwardly facing break edge 68 of a second break edge length "D" of three inches along the entire length thereof.

Referring back to FIG. 1, two ended screw driver member 18 has a eight sided, octagonal cross-section, faceted screw driver shaft 68 having a conventional flathead screw driver end 70 and a conventional Phillips head screw driver end 72 formed at either end thereof. A first circumferential locking bearing groove 74 is formed into screw driver shaft 68 adjacent to flathead screw driver end 70 and a second circumferential locking bearing groove 76 is formed into screw drive shaft 68 adjacent to Phillips head screw driver end 72. First and second circumferential locking bearing grooves 74,76 are sized and positioned along screw driver shaft 68 in a manner such that, referring now to FIGS. 1 and 2, when flat head screw driver end 70 is positioned within faceted socket cavity 24 spring loaded retaining bearing 28 is urged into and held within first circumferential locking bearing groove 74 by spring 27 and when Phillips head screw driver end 72 is positioned within faceted socket cavity 24 spring loaded retaining bearing 28 is urge into and held within second circumferential locking bearing groove 76 by spring 27. Spring loaded retaining bearing 28 maintains screwdriver shaft 68 in connection with handle 12 when held within either first or second circumferential locking bearing grooves 74,76 until release button 32 of depressible release button member 30 is depressed by the user.

Figure 6:
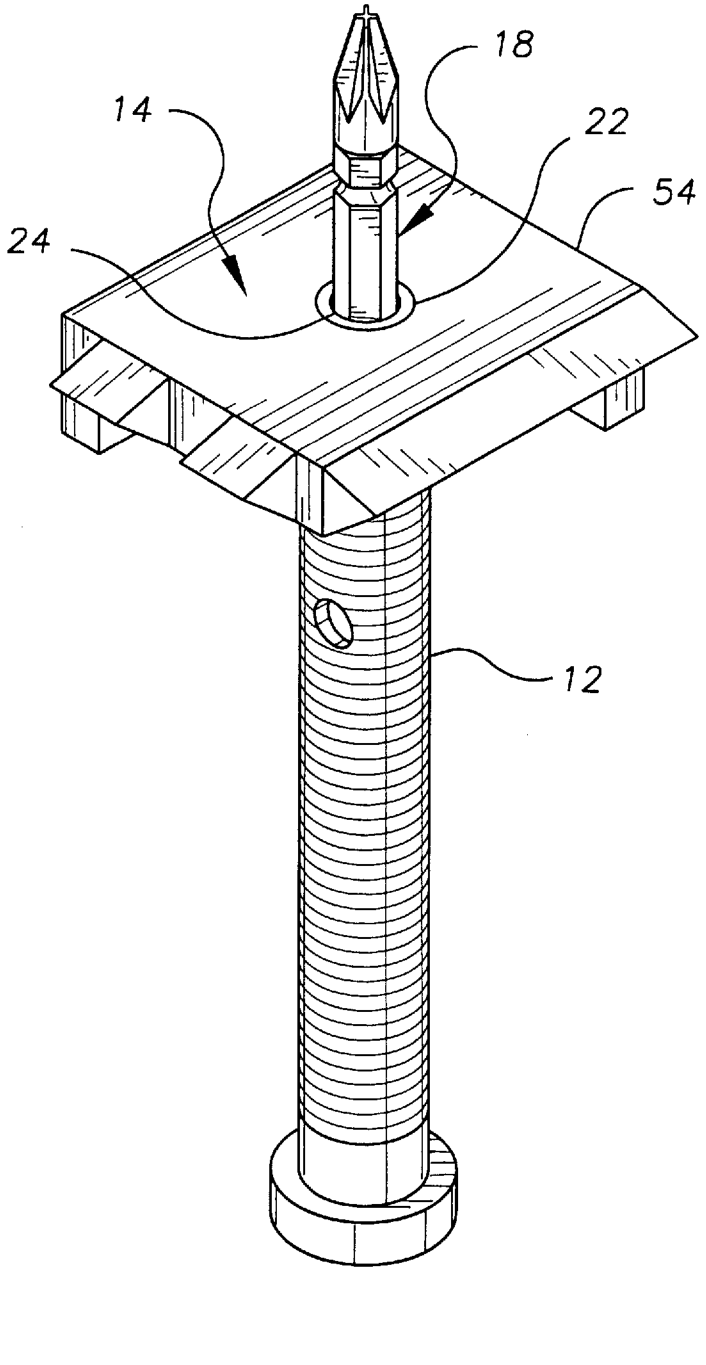
FIG. 6 is a perspective view of the exemplary embodiment of the hinge and window tool system with the handle, the first combined hinge pin removal and window break heads, and the two ended screw driver member secured together for use.

FIG. 6 shows handle 12 with first combined hinge pin removal and window break head 14 threaded onto threaded outer end 22 and flathead screw driver end 70 (shown in FIG. 1) of two ended screwdriver member 18 inserted into faceted socket cavity 24 to form one assembled embodiment of the tool. With general reference to FIGS. 1–6, the tool is used to remove a hinge pin by positioning first claw side 38 against the hinge pin to be removed in a manner such that one of the triangular shaped first claw members 46,48 is positioned on either side of the hinge pin shaft. Planar hammer strike surface 54 of first claw anvil side 40 is then struck with a conventional hammer or mallet driving the triangular shaped first claw members 46,48 between the hinge structure and the head of the hinge pin.

Similarly, the tool can also be used to unstick a painted shut window by positioning first beveled outwardly facing break edge 56 of first window break side 42 between the bottom edge of the window to be unstuck and the window jam and then striking planar hammer strike surface 58 soundly with a hammer or a mallet. Two ended screw driver member 18 is used by inserting the outwardly extending flathead screw driver end 70 or conventional Phillips head crew driver end 72 into the head of the screw to be removed or loosed and then grasping and rotating handle 12 in the conventional fashion.

It can be seen from the preceding description that a hinge and window tool system has been provided that includes a combined hinge pin removal and window break head having a claw side for freeing frozen hinge pins, a claw anvil side, a window break side for freeing painted shut windows, and a window break anvil side; that includes multiple, graduated sized, detachable combined hinge pin removal and window break heads each having a claw side for freeing frozen hinge pins, a claw anvil side, a window break side for freeing painted shut windows, and a window break anvil side; and that includes a detachable screwdriver shaft that is attachable to the handle to allow the user to remove or loosen screws as necessary without retrieving a separate tool.

It is noted that the embodiments of the hinge and window tool system described herein in, detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of he law, it is to be understood that the details herein are to be interpreted as illustrative and not in a limiting sense.

What is claimed is:

1. A hinge and window tool system comprising:

a handle having a threaded outer end and a faceted socket cavity having a spring loaded screw driver shaft retaining mechanism, said screw driver shaft retaining mechanism including a spring loaded retaining bearing mounted on a user depressible release button member;

a first combined hinge pin removal and window break head having a first attachment aperture companionately threaded to screw onto said threaded outer end of said handle, said first combined hinge pin removal and window break head including a first claw side including two first claw members spaced a first distance apart, each first claw member having a first beveled outwardly facing edge of a first edge length, a first claw anvil side positioned opposite said first claw side including a planar hammer strike surface, a first window break side having a first beveled outwardly facing break edge of a first break edge length formed along said entire length thereof, and a first window break anvil side positioned opposite said first window break side including a planar hammer strike surface; and a two ended screw driver member having a first screw driver end and a second screw driver end formed at either end of a faceted screw driver shaft, said faceted screw driver shaft having a first circumferential locking bearing groove adjacent to said first screw driver end and a second circumferential locking bearing groove adjacent to said second screw driver end, said first and second circumferential locking bearing grooves being sized and positioned along said faceted screw driver shaft in a manner such that when said first screw driver end is positioned within said faceted socket cavity said spring loaded retaining bearing is urged into and held within said first circumferential locking bearing groove and when said second screw driver end is positioned within said faceted socket cavity said spring loaded retaining bearing is urged into and held within said second circumferential locking bearing groove, said spring loaded retaining bearing maintaining said screwdriver shaft in connection with said handle when held within said first and second circumferential locking bearing grooves until said release button of said depressible release button member is depressed by a user.

2. The hinge and window tool system of claim 1, wherein:

said first combined hinge pin removal and window break head is of cast steel construction.

3. The hinge and window tool system of claim 2, further including:

a second combined hinge pin removal and window break head having a second attachment aperture companionately threaded to screw onto said threaded outer end of said handle, said second combined hinge pin removal and window break head including a second claw side including two second claw members spaced a second distance apart, each said second claw member having a second beveled outwardly facing edge of a second edge length, a second claw anvil side positioned opposite said second claw side including a planar hammer strike surface, a second window break side having a second beveled outwardly facing break edge of a second break edge length along said entire length thereof, and a second window break anvil side positioned opposite said second window break side including a planar hammer strike surface, said second distance apart being greater than said first distance apart.

4. The hinge and window tool system of claim 3, wherein:

said second combined hinge pin removal and window break head is of cast steel construction.

5. The hinge and window tool system of claim 3 wherein:

said faceted screw driver shaft has an eight side cross-sectional shape.

6. The hinge and window tool system of claim 5 wherein:

said faceted screw driver shaft has an octagonal cross-sectional shape.

7. The hinge and window tool system of claim 4 wherein:

said faceted screw driver shaft has an eight side cross-sectional shape.

8. The hinge and window tool system of claim 7 wherein:

said faceted screw driver shaft has an octagonal cross-sectional shape.

9. The hinge and window tool system of claim 2 wherein:

said faceted screw driver shaft has an eight side cross-sectional shape.

10. The hinge and window tool system of claim 9 wherein:

said faceted screw driver shaft has an octagonal cross-sectional shape.

11. The hinge and window tool system of claim 1, further including:

a second combined hinge pin removal and window break head having a second attachment aperture companionately threaded to screw onto said threaded outer end of said handle, said second combined hinge pin removal and window break head including a second claw side including two second claw members spaced a second distance apart, each said second claw member having a second beveled outwardly facing edge of a second edge length, a second claw anvil side positioned opposite said second claw side including a planar hammer strike surface, a second window break side having a second beveled outwardly facing break edge of a second break edge length along said entire length thereof, and a second window break anvil side positioned opposite said second window break side including a planar hammer strike surface, said second distance apart being greater than said first distance apart.

12. The hinge and window tool system of claim 11, wherein:

said second combined hinge pin removal and window break head is of cast steel construction.

13. The hinge and window tool system of claim 12 wherein:

said faceted screw driver shaft has an eight side cross-sectional shape.

14. The hinge and window tool system of claim 15 wherein:

said faceted screw driver shaft has an octagonal cross-sectional shape.

15. The hinge and window tool system of claim 12 wherein:

said faceted screw driver shaft has an eight side cross-sectional shape.

16. The hinge and window tool system of claim 15 wherein:

said faceted screw driver shaft has an octagonal cross-sectional shape.

17. The hinge and window tool system of claim 1 wherein:

said faceted screw driver shaft has an eight side cross-sectional shape.

18. The hinge and window tool system of claim 17 wherein:

said faceted screw driver shaft has an octagonal cross-sectional shape.

* * * * *